June 5, 1928.                    1,672,710
E. R. CHITTENDEN
SPRING HOOK
Filed Nov. 30, 1927

Inventor,
E. R. Chittenden
Per
A. S. Patterson   Atty.

Patented June 5, 1928.

1,672,710

UNITED STATES PATENT OFFICE.

EASON ROBERTS CHITTENDEN, OF SURBITON, ENGLAND.

SPRING HOOK.

Application filed November 30, 1927, Serial No. 236,697, and in Great Britain December 8, 1926.

This invention relates to spring hooks and has reference to spring hooks of the kind described and claimed in the specification of Letters Patent No. 1,059,117 dated 15th April, 1913, granted to the applicant herein, and it has for its object to provide improvements by means of which certain advantages shall be obtained.

In order that the invention, the object and nature of which have been set forth, may be clearly and readily understood, reference will now be made to the constructional embodiment illustrated on the accompanying drawing, on which:—

Figure 1:
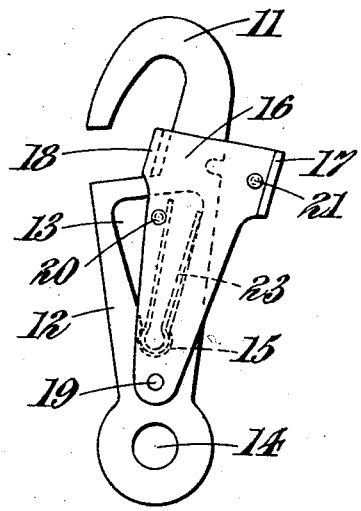
Figure 2:
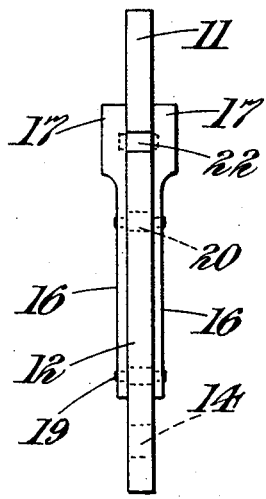

Fig. 1 is a side elevation;

Fig. 2 a rear elevation; and

Figure 3:
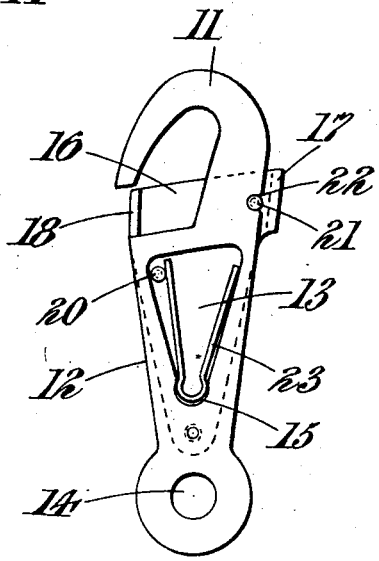

Fig. 3 a side elevation with one of the members of the tongue or locking member removed.

The shank member, which is a casting, forging or stamping, comprises a hook portion 11 and a body member 12. The body member 12 has two holes 13, 14 therethrough. The one hole 13 is of approximately triangular shape with one angle widened out, as at 15, for a purpose hereafter mentioned. The other hole 14 is circular and in this hole the swivel or chain is attached. The tongue or locking member comprises two members 16 of similar shape. Each member 16 has on one edge a lug or projection 17 and on the other edge a lug or projection 18. The lugs or projections 17, 18 extend at right angles to the members 16 and in opposite directions. The members 16 are placed on opposite sides of the shank member and are pivotally mounted on a common pivot 19. The members 16 are also connected together by rivets 20, 21, the rivet 20 passing through the hole 13 and the rivet 21 through a recess 22 in the shank member when the tongue or locking member is in the position shown in Fig. 3. 23 is a spring of U-shape which is placed in the hole 13 so that one arm bears on a wall of the hole and the other on the rivet 21. The angle portion of the spring 23 is contained in the portion 15 of the hole 13. When two members 16 are mounted in position the lugs or projections 17 constitute finger grips, and the lugs or projections 18 contact with one another and when the members 16 are in the position in which the hook 11 is closed form a continuation of the outside edge of the body member 12 of the shank member and come behind the end or point of the hook portion 11.

In a modification, the two members 16 may be integral and bent one over the other, the connecting member when the tongue or locking member is in position acting as do the lugs or projections 18.

In some cases the lugs or projections 17 may be omitted.

What I claim is:—

A spring hook comprising, in combination, a shank member consisting of a hook portion and a body member having a hole of approximately triangular shape therethrough, a locking member of bipartite construction with the component members placed on opposite sides of the body member and mounted on a common pivot, a laterally extending lug on an edge of each component member, said lugs extending towards each other, and a U-shaped spring contained within the hole in the body member to hold the locking member in a position with the opposed lugs closing the gap between the end of the hook and the body member.

Dated this 11th day of November, 1927.

EASON ROBERTS CHITTENDEN.